United States Patent [19]

Buttriss

[11] 4,075,748

[45] Feb. 28, 1978

[54] FASTENER EMPLACEMENT MECHANISM

[75] Inventor: Albert T. Buttriss, Fairview Park, Ohio

[73] Assignee: Eaton Corporation, Cleveland, Ohio

[21] Appl. No.: 763,373

[22] Filed: Jan. 28, 1977

[51] Int. Cl.[2] .......................... B23P 19/04; B25D 9/18

[52] U.S. Cl. .......................................... 29/225; 29/809; 29/243.58; 227/130

[58] Field of Search ................ 29/809, 243.56, 243.58, 29/225; 227/130

[56] References Cited

U.S. PATENT DOCUMENTS

| | | | |
|---|---|---|---|
| 3,501,827 | 3/1970 | Munse | 29/225 |
| 3,543,376 | 12/1970 | Lovell et al. | 29/243.58 X |
| 3,672,029 | 6/1972 | Butriss | 29/243.56 |
| 3,702,494 | 11/1972 | Munse | 29/225 |

*Primary Examiner*—Milton S. Mehr
*Attorney, Agent, or Firm*—J. R. Teagno

[57] ABSTRACT

An automatic fastener emplacement mechanism for selectively applying fasteners, such as spring clips, to a work piece is provided. The mechanism preferably includes a vibratory hopper or other storage means for receiving the spring clips in bulk and properly orienting same on a track and an assembly tool having a nose piece for properly positioning the tool relative to the work piece and a ram for driving the fastener onto the work piece. Placement of the work piece properly within the nose piece will result in contact and/or displacement of an actuation member or trigger by the work piece which will cause a single fastener such as a spring clip to be fed, preferably by known means such as pneumatically through an escapement down a delivery tube, directly from the hopper track to the work piece. The clip is held in the nose piece against the work piece by the continued introduction of compressed air into the tube. Thus, the nose piece does not require a stop member or a catcher/holder mechanism. The actuation or trigger member is preferably located well within the nose piece, which will result in a clip normally being fed from the hopper only when a work piece is properly positioned within the nose piece. The actuation member is preferably located to resist intentional and/or unintentional contact by means other than a properly positioned work piece. As the nose piece is moved slightly away from the work piece, the actuation member will cease to be contacted and/or displaced by the work piece which will cause a ram to drive the spring clip onto the work piece and will terminate the provision of compressed air into the delivery tube.

16 Claims, 6 Drawing Figures

FASTENER EMPLACEMENT MECHANISM

BACKGROUND OF THE INVENTION

1. Field of the Invention

The present invention relates to automatic mechanisms for applying fasteners such as spring clips or the like to work pieces and more particularly to automatic mechanisms for applying spring clips one at a time directly from a storage means such as a bulk loaded hopper onto a properly positioned work piece and for resisting release of spring clips from the hopper escapement in the absence of a work piece properly positioned within an assembly tool nose piece.

2. Description of the Prior Art

Various types of automatic fastener emplacement devices and mechanisms are well known in the prior art. Examples of these prior art devices may be seen by reference to U.S. Pat. Nos. 3,278,105; 3,517,856; 3,543,376; 3,672,029 and 3,702,494.

The prior art mechanisms were less than totally satisfactory as many utilized assembly heads wherein a fastener is held in the head ready for assembly. When the prior art mechanisms were actuated, a ram drove the held fastener out of its holder and on to the work. The fastener applying cycle was then completed as another fastener was released from a hopper mechanism and blown down through a delivery tube and caught and held by a catcher/holder. The catcher/holder devices of the prior art mechanisms tended to wear out or break frequently due to the speed at which the fasteners travel, stop, then are fired on to the work. Many of the prior art devices were also easily actuated to eject a fastener under the full force of a ram in the absence of a work piece properly positioned relative to the nose piece.

The use of stop members and/or catcher/holder devices created a component or group of components subject to excessive wear and/or breakage. Also, fasteners held by the catcher/holder device in a tool head were often not completely visible to the operator and thus were difficult to align with the work piece prior to the assembly therewith and/or were subject to damage and/or jamming of the fastener applying mechanism during the positioning of the work piece relative to the assembly head.

The ability of the prior art mechanisms to easily be caused to eject fasteners, often at a relatively high force supplied by the ram, in the absence of a work piece properly positioned relative to the assembly heads or nose pieces thereof often resulted in the wasteful firing or ejecting of the fasteners, occasionally dangerously at fellow workers and the like. The ability to eject fasteners in the absence of a work piece properly positioned in the nose piece also resulted in improperly applied fasteners and the like.

SUMMARY OF THE INVENTION

In accordance with the present invention, many of the drawbacks of the prior art devices have been overcome by the provision of an automatic fastener emplacement mechanism which applies the fasteners, such as spring clips or the like, directly from the track of a hopper or similar storage means directly onto the work piece. The mechanism includes an actuation member which will normally be contacted and/or displaced only by a work piece properly positioned relative to the mechanism nose piece to actuate the escapement means of the hopper and begin the emplacement cycle. The actuation means is located within the nose piece to resist contact other than by a properly positioned work piece. Cessation of contact and/or displacement of the actuation member will result in a single stroke of the ram to drive the fastener onto the work piece and deactivation of the supply of compressed air or the like into the fastener delivery tube connecting the nose piece and the escapement.

The above is accomplished by providing a mechanism comprising a hopper assembly, an escapement, and an assembly tool having a nose piece for receiving the work piece in proper position for application of a fastener and a ram for driving the fastener onto the work piece. The assembly tool is in fluid communication with the escapement of the hopper by means of pneumatic delivery tubing, preferably flexible tubing having an internal cross section generally conforming to the cross-section of the fastener, as is well known in the art.

As a work piece is properly positioned in the nose piece, the actuation member will be contacted and/or displaced which causes the escapement to allow a fastener to be blown down the pneumatic tubing from the track of the hopper through the nose piece and into contact with the work piece. In effect, the work piece acts as a stop member or a holder/catcher and the assembly tool nose piece is "open throat" . As long as the actuation member is displaced, the escapement will continue the supply of compressed air into the delivery tube to hold the blown down fastener in contact with the work piece. At this point, minor adjustment of the fastener on the work piece is possible. As the assembly tool is slightly moved from the work piece, the actuation member loses contact with the work piece, and the fastener applying or emplacement cycle is completed as the assembly tool ram drives the fastener onto the work piece and the escapement ceases introduction of compressed air into the delivery tube. It should be noted that if the mechanism misfires, or is intentionally caused to fire, the fastener will simply fall to the floor in a harmless stream of air, and will not be fired from the nose piece under the driving force of the ram.

DESCRIPTION OF THE PREFERRED EMBODIMENT

Figure 1:
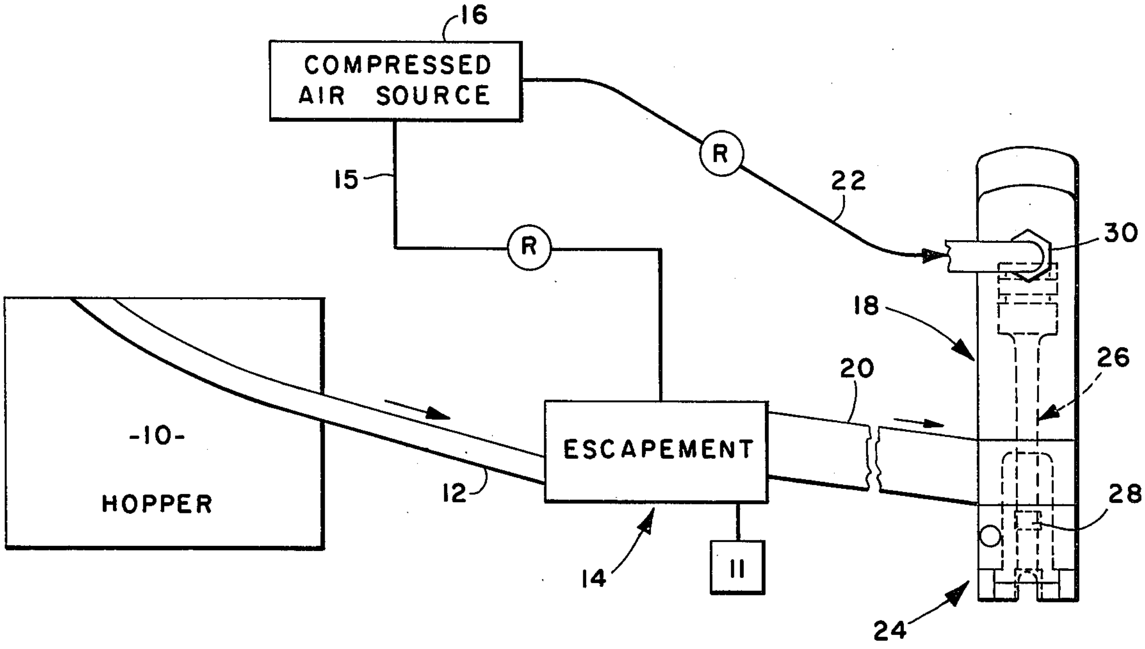
FIG. 1 is a schematic illustration of the fastener emplacement mechanism of the present invention.

Certain terminology may be used in the following description for convenience and reference only and will not be limiting. The words "upwardly", "downwardly", "rightwardly" and "leftwardly" will designate directions in the drawings to which the reference is made. The words "forward" and "rearward" may refer respectively to the front and rear ends of the fastener emplacement mechanism as same is conveniently illustrated in the drawings. The words "inwardly" and "outwardly" will refer to directions toward and away from, respectively, the geometric center of the device and designated parts thereof. Said terminology will include the words above specifically mentioned, derivatives thereof, and words of similar import.

A schematic illustration of the automatic fastener emplacement mechanism of the present invention may be seen by reference to FIG. 1. Preferably, the mechanism includes a vibratory hopper 10 having a bowl (not shown) into which the fasteners may be placed in bulk. The hopper 10 includes a track 12 upon which properly oriented fasteners will leave the hopper. Hoppers of this type are well known in the prior art and the specific structure thereof forms no part of the present invention. The fasteners utilized in connection with the present invention are preferably of the so called "U", "C", or "J" type and examples thereof may be seen by reference to U.S. Pat. No. 3,702,494 or U.S. Pat. No. 3,672,029. Of course, other types of spring clip and/or solid fasteners and the like may be utilized in connection with the emplacement mechanism of the present invention. The track 12 leads the properly oriented fasteners to an escapement mechanism 14 of known design. The escapement mechanism is in fluid communication via supply hose 15 with a source of pressurized fluid 16 and is connected to the fastener applying tool 18 by means of a pneumatic fastener delivery tube 20. Preferably the pneumatic delivery tube 20 is highly flexible. Briefly, the escapement mechanism will allow one fastener at a time to be blown down from the track 12 to the nose piece of the tool 18 upon proper actuation thereof as is well known in the prior art. The escapement mechanism 14 is effective to control entry of fasteners from track 12 into tube 20 and to control the introduction of compressed air into the tube 20. Mechanisms of this type are well known in the prior art and the specific structural details thereof form no part of the present invention. The source of pressurized fluid 16 also communicates with the application tool 18 by means of an air supply hose 22 for purposes of operating the fastener applying ram as will be described in greater detail below. The fastener assembly tool 18 includes a nose piece 24, a reciprocal ram 26, and a trigger member or actuation member 28 located within the nose piece 24 which will control the operation of escapement 14 and ram 26.

Briefly, by way of example, the edge of a work piece, such as an apertured panel or the like, is positioned within the nose piece 24, which will contact and/or displace actuation member, or trigger 28. Depression of trigger 28 will signal the escapement to release one fastener and to open a valve allowing compressed air to enter pneumatic tube 20 to "blow down" or "chase" a single fastener down the tube 20 to the nose piece 24 and to there hold the fastener against the panel. The escapement introduces air into the tube behind the part to propel the fastener down the tube and, as long as the trigger is displaced, continues to introduce air into the tube to hold the fastener against the work piece. The operator may then move the panel laterally of the axis of the nose piece to make minor adjustments necessary to properly align the fastener with the aperture. Contact and/or displacement of trigger 28 will also cause a signal to be sent to valve 30 causing ram 26 to move upwardly or retract from the nose piece. The operator will then begin to move the work piece out of the nose piece which will cause the actuation member to return to its non-contacted and/or non-displaced condition. The return of the actuation member will cause a signal to be sent to the valve 30 controlling the ram 26 which will cause the ram to complete one stroke by moving downwardly into the nose piece driving the fastener onto the work piece. The return of the actuation member will also signal the escapement to cut off the supply of compressed air to tube 20.

It is understood that while the assembly tool 18 is illustrated as permanently mounted in an assembly fixture, the tool 18 could be a portable hand held assembly gun, as is well known in the art.

The source of pressurized fluid 16 is preferably a source of compressed air, such as factory air, which has been filtered and lubricated. The compressed air is then regulated to acceptable pressure levels. The signals sent by the actuation member or trigger 28 to the pilot valve 11 controlling escapement 14 and the ram control valve 30 are preferably air signals; however, other signals such as electric and/or mechanical are suitable.

It is understood that the source of pressurized fluid or air will also supply the filtered, lubricated, regulated, compressed air to the valves and supply lines comprising the air signal/control apparatus. As is well known, such apparatus usually comprises normally open valves which are closed to pressurize a normally vented line, normally closed valves which are opened to vent a normally pressurized line, pilot valves, drive valves and the like.

Figure 2:
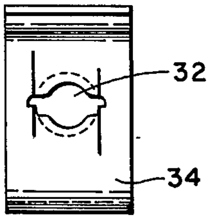
FIG. 2 is a top view of one type of spring clip fastener which may be utilized with the mechanism of FIG. 1.
Figure 3:
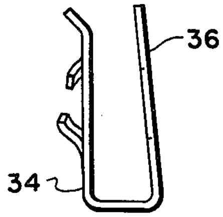
FIG. 3 is a side elevation of the fastener shown in FIG. 2.
Figure 4:
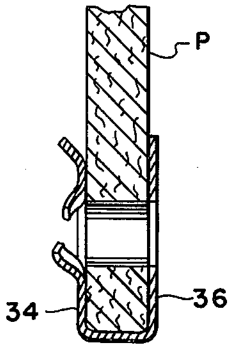
FIG. 4 is a fragmentary view showing the fastener of FIGS. 2 and 3 in the installed position on a work piece.

One form of fastener F for use with the fastener emplacement mechanism of the present invention may be seen by reference to FIGS. 2 and 3. This type of fastener F is generally referred to as a "C", "U", or "J" fastener. Fasteners of this type normally include a thread impression or the like 32 and are designed to be installed upon panel surfaces in registry with preformed screw apertures therein. However, the emplacement mechanism of the present invention is suitable for the emplacement of other types of fasteners, such as rivet type fasteners, in various types of work pieces. For purposes of illustration only, the present invention will be described in the form of an emplacement mechanism for placing "U" type fasteners onto an aperture panel is registry with said apertures. As shown, the fasteners F may be constructed from a strip of sheet metal and have a generally U-shaped configuration defined by body portion 34 and a return bent body portion 36 which are adapted to receive therebetween the support panel P, as may best be seen by reference to FIG. 4. Further details with respect to the construction and operation of fasteners of this type may be had by reference to the U.S. patent to R. A. Hartman et al. No. 2,672,905.

The actuation member 28 is located generally interiorly of nose piece 24 to resist contact and/or displacement thereof by means other than a properly positioned work piece. Of course, initiation of the emplacement cycle may be further controlled by a manual trigger, such as a finger trigger on the tool or a foot pedal, which is so designed that it will not operate until the actuation member 28 is also contacted and/or displaced. This type of a firing control may include the additional feature of requiring a series of operations, such as displacement of the actuation member and then displacement of the manual trigger, to be required in sequence prior to initiation of an emplacement sequence. Firing control circuits of this type may be seen in greater detail by reference to U.S. Pat. No. 3,278,105.

Figure 6:
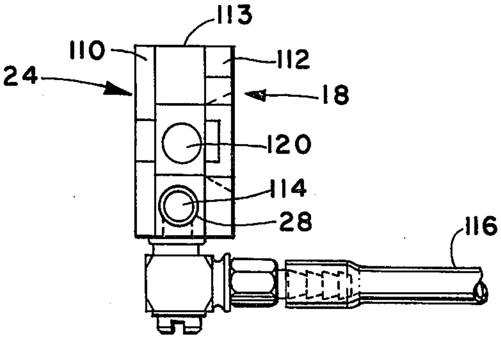
FIG. 6 is a fragmentary bottom view of the assembly tool shown in FIG. 5, especially the nose piece thereof.
Figure 5:
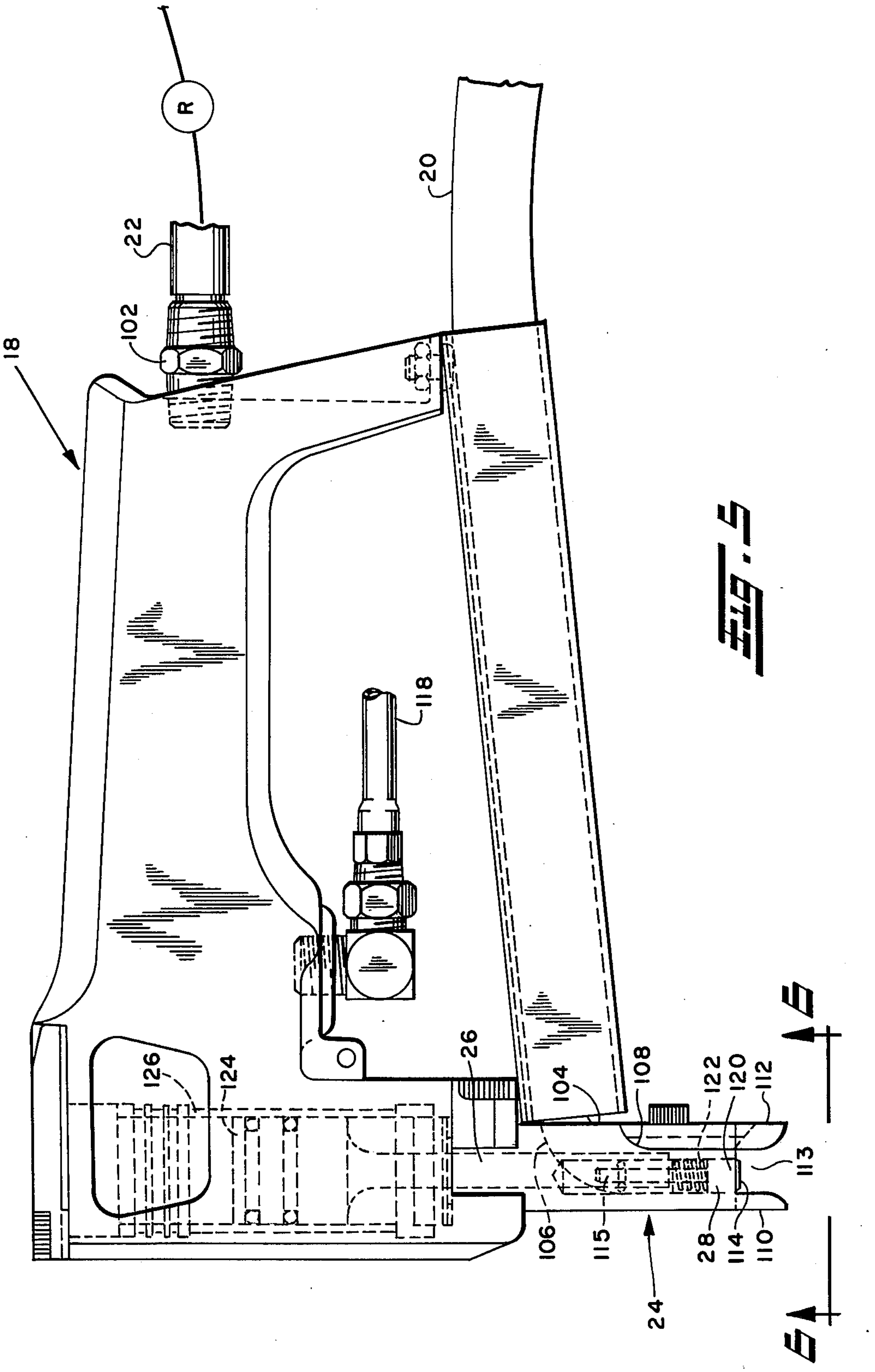
FIG. 5 is a side elevational view, partially in section, of the assembly tool of the present invention.

The assembly tool 18 of the present invention is illustrated in greater detail in FIGS. 5 and 6. Assembly tool 18 is suitable for mounting within an assembly fixture or for hand held operation.

The assembly tool 18 is fluidly connected to the source of compressed air by means of supply line 22 which is preferably flexible. The supply line 22 is fluidly attached to the assembly tool by means of a commonly available fluid connector 102. The compressed air supplied through supply line 22 will provide the driving force to lower and raise the ram 26 as will be described in detail below.

The fasteners F, in this example spring clips, are delivered from the track 12 of the hopper 10 under the influence of compressed air introduced into the fastener delivery tube 20. The fastener delivery tube is releasably retained in the assembly tool 18 by frictional means and the discharge end 104 of the delivery tube 20 is located adjacent to and in communication with the nose piece 24. A pair of guide rails, 106 and 108, located within the nose piece adjacent the discharge end of the delivery tube 20 guide the fasteners discharged from the delivery tube into proper position within the nose piece for emplacement onto a work piece, such as panel P.

The nose piece 24 is a bifurcated structure having generally parallel elements 110 and 112 separated by a slot 113 of a width slightly greater than the thickness of the thickest panel P onto which fasteners are expected to be emplaced by the mechanism of the present invention. The slot 113 may be slightly outwardly flaired at the outlet end 111 thereof to ease insertion of the panel P into the slot. The slot 113 separating the elements 110 and 112 may have an axial extension generally equal to spacing of screw apertures from the edge of panel P.

Located within the nose piece 24 is the actuation member or trigger 28. The trigger 28 has a lower surface 114 which is spaced from lower end of the nose piece by a distance slightly less than the length of slot 113 and is partially aligned with slot 113 so that panel edges fully inserted into slot 113 will contact and/or displace the trigger 28. In the example shown, displacement of trigger 28 will open trigger valve 115 while non-displacement of the trigger will allow the valve to remain in, or return to, its normally closed condition. Opening of trigger valve 115 will result in venting of normally pressurized line 116 which will result in operation of a pilot valve 11 which controls the escapement to release a single fastener from the track 12 into the delivery tube 20 and to begin introduction of compressed air into the delivery tube 20 to propel the fastener down the tube. Opening of the trigger valve 115 will also cause pilot valve 11 to cause the normally pressurized ram control line 118 to be vented which will result in an assembly tool pilot valve, not shown, causing ram 26 to retract or move upwardly from its normally forward or lower position whereat the ram would block the discharge end 104 of the delivery tube. In the lower position, the drive end 120 of the ram 26 generally spaced from the lower end of the nose piece by a distance generally less than the length of slot 113 but greater than the spacing of lower surface 114 of trigger 28 from the lower edge of the nose piece.

As the trigger 28 is contacted and upwardly displaced by a work piece being fully inserted into the slot 113 of the nose piece 24, the venting of line 116 causes pilot valve 11 to cause line 118 to be pressurized which in turn operates an assembly tool pilot valve causing the ram 26 to move upwardly or retract. The retraction of the ram 26 occurs at substantially the same time that a single fastener F is released from the escapement and the ram retracts sufficiently in the time required to blow the fastener down delivery tube 20 to allow the released fastener to enter the nose piece. As the trigger 28 is released to return to the non-displaced condition, the trigger valve 115 is closed causing line 116 to be repressurized and pilot valve 11 causes the assembly tool pilot valve to cause the compressed air in supply line 22 to drive the ram downwardly to drive the fastener F onto the work piece, panel P.

The ram 26 comprises a drive end 122 having a lower, or drive surface 120 and a double sided piston 124 sealingly and reciprocally received in cylinder 126 of the assembly tool body.

In operation, the operator will position the panel P within the slot 113 of the nose piece 24 sufficiently to contact and/or displace trigger 28. As trigger 28 is displaced, the normally closed trigger valve 115 will open, venting normally pressurized line 116. Venting of line 116 will result in pilot valve 11 causing the escapement to release a single fastener F from the hopper track 12 to the delivery tube 20 and to introduce compressed air from supply line 15 into the tube to blow or chase the fastener F down the tube into the nose piece 24 and there to hold the fastener F against the panel P. The guide rails 106 and 108 will guide the fastener from the tube into proper position within the nose piece against the work piece. Venting of line 116 will also result in pilot valve 11 pressurizing normally vented line 118 which will result in a pilot valve in the assembly tool causing the ram 26 to retract. After the operator is satisfied that the fastener F is properly positioned for assembly onto the panel P, i.e. that the thread impression will align with the screw aperture in the panel, the panel P is moved slightly outwardly from nose piece 24, causing trigger 28 to return to its non-displaced condition and trigger valve 115 closes pressurizing line 116.

As line 116 is pressurized, the pilot valve 11 causes the escapement 14 to cease introduction of compressed air into delivery tube 20 and normally pressurized line 118 is vented which causes the pilot valve at the assembly tool to direct the compressed air from supply line 22 to the top of cylinder 126 to drive ram 26 downwardly to drive the fastener F onto the panel P.

When the emplacement mechanism of the present invention is utilized with spring clips F, the clips are propelled down the delivery tube 20 with the free ends of the body portions forward and the guide rails cause the free ends of the body portions to be pressed against the edge of panel P by the action of compressed air from delivery tube 20.

Although the invention has been described in its preferred form with a certain degree of particularity, it is understood that the present disclosure of this preferred form is by way of example only and that various changes and modifications in the construction and arrangement of the parts may be resorted to without departing from the scope of the invention as hereinafter claimed.

I claim:

1. An automatic fastener emplacement device for applying fasteners one at a time to a work piece, said device comprising:

a source of oriented fasteners;

an assembly tool having a nose piece for receiving the work piece therein and a ram for driving fasteners from the nose piece onto the work piece, said nose piece having an open end for receipt of the work piece therein and ejection of fasteners therefrom;

a delivery system for conveying fasteners one at a time from said source to said nose piece;

an escapement assembly for controlling said delivery system; and a trigger activated control mechanism including a trigger located within said nose piece, said control upon contact of said trigger effective to cause said escapement assembly to release a single fastener from said source to said delivery system and to cause said delivery system to convey said released fastener to said nose piece and upon termination of contact with said trigger effective to cause said ram to drive said delivered fastener from said nose piece.

2. The device of claim 1 wherein said nose piece will guide fasteners received from said delivery system directly to the open end thereof.

3. The device of claim 2 wherein a work piece properly positioned within said nose piece for application of a fastener onto the work piece will contact said trigger.

4. The device of claim 3 further comprising connector means for fluidly connecting said device to a source of pressurized fluid and wherein said delivery system comprises a delivery tube having an inlet end in communication with said source and a discharge end in communication with said nose piece and wherein said control, upon contact of said trigger, causes pressurized fluid to be continuously introduced into said tube to propel said released fastener from said source to said nose piece and to retain said fastener in said nose piece against a work piece positioned in said nose piece, said control causing introduction of said fluid into said tube to cease upon termination of contact of said trigger by the work piece.

5. The device of claim 4 wherein said source comprises a hopper having an outlet track in communication with the inlet end of said delivery tube.

6. The device of claim 4 wherein fasteners received in said nose piece from the discharge end of said tube may travel directly to the open end of said nose piece.

7. The device of claim 4 wherein said source of pressurized fluid is an air compressor.

8. The device of claim 4 wherein said nose piece includes two substantially parallel members defining a slot therebetween designed to receive the work piece therein, said trigger extending slightly into said slot to resist contact other than by a work piece properly positioned in said nose piece for application of a fastener thereon.

9. The device of claim 4 wherein said tube and said nose piece define a passage having a cross section conforming generally to and slightly larger than the cross section of the fasteners.

10. An automatic fastener emplacement device for applying fasteners one at a time to work pieces, said device comprising:

connector means for connecting said device to a source of compressed air;

a bulk fed hopper having a track by which similarly oriented fasteners are supplied from the hopper;

an assembly tool having a nose piece for receiving a work piece therein and positioning the work piece for application of a fastener thereto and a ram for driving fasteners from the nose piece onto work pieces, said nose piece having an open end for receipt of the work pieces therein and for ejection of the fasteners therefrom;

a pneumatic delivery tube having an inlet end in communication with said track and a discharge end opening to said nose piece;

an escapement assembly for releasing fasteners one at a time from said track to the inlet end of said tube and for introducing compressed air into said tube to propel fasteners from inlet end to said discharge end;

a trigger actuated control mechanism including a trigger located within said nose piece, said control mechanism upon contact of said trigger effective to cause said escapement assembly to release a single fastener from said track into the inlet end of said tube and to introduce compressed air into said tube to propel said released fastener down said tube and into said nose piece, said control mechanism upon continued contact of said trigger effective to continue introduction of compressed air into said tube and said control mechanism upon termination of contact of said trigger effective to cause said ram to eject fasteners from said nose piece and to cause said escapement assembly to cease introduction of compressed air into said tube.

11. The device of claim 10 wherein said fasteners are spring clips having a pair of legs designed to receive an edge of a work piece therebetween, said fasteners are propelled down said tube with the free ends of the legs forward and said nose piece includes guides to guide fasteners from the discharge end of the tube to the open end of the nose piece with the free ends of the legs towards the open end.

12. The device of claim 11 wherein said nose piece comprises a pair of substantially parallel members defining a slot therebetween opening to the open end of said nose piece, substantially total insertion of said edge of said work piece into said slot corresponding to proper positioning of said work piece relative to said assembly tool for application of a fastener to said work piece, said trigger extending slightly into said slot for contact with the edge of a work piece substantially totally inserted into said slot.

13. The device of claim 12 wherein said ram comprises a double ended piston sealingly and slidingly received in a cylinder formed in said assembly tool, introduction of compressed air into the first end of said cylinder effective to retract said ram from said nose piece and introduction of compressed air into the other end of said cylinder effective to drive said ram into said nose piece.

14. The device of claim 13 wherein said control mechanism comprises a plurality of air pressure controlled valves and air lines and said trigger comprising a normally closed valve which is forced open upon contact thereof to vent a normally pressurized control line which operates a pilot valve which controls both the escapement mechanism and the ram.

15. The device of claim 13 wherein said fasteners may pass directly through said nose piece from the discharge end of the delivery tube to the open end of the nose piece when said ram is in the retracted position.

16. The device of claim 13 wherein said control mechanism comprises:

a first normally pressurized air line operable to position a pilot valve operable to control the escapement assembly, venting of said first air line operable for said pilot valve to cause the escapement to release a single fastener from the track to the inlet end of the delivery tube, to introduce compressed air into the tube and to cause a second normally unpressurized air line to be pressurized causing said ram to retract, repressurization of said first line operable to position said pilot valve to cease introduction of compressed air into the delivery tube and to depressurize the second line causing the ram to be driven forward into the nose piece;

a normally closed valve controlled by the trigger, in fluid communication with said first line, contact of the trigger effective to open said normally closed valve to vent said first line; and means for connecting said source of pressurized fluid to said first and second lines, said means regulating the pressure supplies to such first and second lines.

* * * * *